(12) United States Patent
Rusch et al.

(10) Patent No.: US 11,697,200 B2
(45) Date of Patent: Jul. 11, 2023

(54) POWER TOOL AND METHOD

(71) Applicant: FESTOOL GMBH, Wendlingen (DE)

(72) Inventors: Marc Rusch, Esslingen am Neckar (DE); Markus Schmid, Wendlingen am Neckar (DE)

(73) Assignee: FESTOOL GMBH, Wendlingen (DE)

( * ) Notice: Subject to any disclaimer, the term of this patent is extended or adjusted under 35 U.S.C. 154(b) by 489 days.

(21) Appl. No.: 16/633,200

(22) PCT Filed: Jun. 28, 2018

(86) PCT No.: PCT/EP2018/067432
§ 371 (c)(1),
(2) Date: Jan. 23, 2020

(87) PCT Pub. No.: WO2019/020307
PCT Pub. Date: Jan. 31, 2019

(65) Prior Publication Data
US 2021/0154819 A1    May 27, 2021

(30) Foreign Application Priority Data

Jul. 24, 2017  (WO) .................. PCT/EP2017/068648
Jul. 24, 2017  (WO) .................. PCT/EP2017/068649

(51) Int. Cl.
*B25F 5/00*   (2006.01)
*B25B 21/00*  (2006.01)
(Continued)

(52) U.S. Cl.
CPC .............. *B25F 5/001* (2013.01); *B25B 21/00* (2013.01); *B25B 23/14* (2013.01); *H02K 7/145* (2013.01)

(58) Field of Classification Search
CPC ... G05B 11/32; G01L 5/16; B25F 5/00; B25B 21/00; B25B 23/14
See application file for complete search history.

(56) References Cited

U.S. PATENT DOCUMENTS 3,923,126 A   12/1975  Bidanset
4,802,095 A   1/1989   Jeppsson
(Continued)

FOREIGN PATENT DOCUMENTS

DE   10 2013 212691   12/2014
DE      102014206278   10/2015
(Continued)

OTHER PUBLICATIONS

Examination Report issued in parallel European Patent Application No. 18734813.1, dated Apr. 30, 2021, 6 pages.
(Continued)

*Primary Examiner* — Andrew M Tecco
*Assistant Examiner* — Jacob A Smith
(74) *Attorney, Agent, or Firm* — Hamre, Schumann, Mueller & Larson, P.C.

(57) ABSTRACT

A power tool, including a support structure, a pivot bearing arranged on the support structure, a shaft mounted on the support structure via the pivot bearing, a rotatable tool coupled to the shaft, in particular a saw blade, milling cutter or grinding wheel, a strain gauge arrangement for detecting a mechanical quantity which depends on a force emanating from the tool, and a control device which is adapted to recognize an event and/or a state of the power tool according to the detected mechanical quantity. The strain gauge arrangement is arranged on a stationary structure section coupled in a force-transmitting manner to the pivot bearing and is not arranged on the pivot bearing.

17 Claims, 9 Drawing Sheets

(51) Int. Cl.
   *B25B 23/14* (2006.01)
   *H02K 7/14* (2006.01)

(56) References Cited

U.S. PATENT DOCUMENTS

| | | | |
|---|---|---|---|
| 5,850,044 A | 12/1998 | Spletzer | |
| 7,055,417 B1 | 6/2006 | Gass | |
| 2002/0012484 A1 | 1/2002 | Salou et al. | |
| 2002/0037785 A1 | 3/2002 | Wissmach et al. | |
| 2004/0181951 A1 | 9/2004 | Wittke | |
| 2012/0036725 A1 | 2/2012 | Osborne | |
| 2012/0289377 A1* | 11/2012 | Aoki | B25D 16/003 477/107 |
| 2014/0166323 A1 | 6/2014 | Cooper | |
| 2016/0263674 A1 | 9/2016 | Laliberte | |
| 2017/0148351 A1 | 5/2017 | Mourad et al. | |

FOREIGN PATENT DOCUMENTS

| | | | |
|---|---|---|---|
| DE | 102014223374 | | 5/2016 |
| DE | 102015211584 A1 | | 12/2016 |
| EP | 0 199 883 | | 11/1986 |
| EP | 0978714 A2 * | | 7/1999 ............... G01L 5/16 |
| EP | 0978714 | | 2/2000 |
| EP | 0978714 A2 * | | 2/2000 ............... G01L 5/16 |
| EP | 1815931 | | 8/2007 |
| EP | 2218533 | | 8/2010 |
| EP | 2604388 | | 6/2013 |
| JP | H08-159151 | | 6/1996 |
| JP | 2002-98138 | | 4/2002 |
| JP | 2006-119000 | | 5/2006 |
| JP | 2006119000 A * | | 5/2006 ............... G01L 5/16 |
| JP | 2006-226683 | | 8/2006 |
| JP | 2011-101920 | | 5/2011 |
| JP | 2013078820 | | 5/2013 |
| WO | 0126064 A2 | | 4/2001 |
| WO | 2009/032314 | | 3/2009 |
| WO | 2010/059786 | | 5/2010 |
| WO | 2014105935 A1 | | 7/2014 |

OTHER PUBLICATIONS

International Search Report in corresponding PCT/EP2018/067432, dated Sep. 26, 2018.
Written Opinion in corresponding PCT/EP2018/067432, dated Sep. 26, 2018.
Office Action from corresponding Japanese application No. 2020-503770 dated Dec. 8, 2021 (16 pages).
Notice of Reasons for Refusal issued in Japanese Application No. 2020-503770, dated Jun. 8, 2022.

* cited by examiner

POWER TOOL AND METHOD

The invention pertains to a power tool comprising a support structure, a pivot bearing arranged on the support structure, a shaft mounted on the support structure via the pivot bearing, a rotatable tool coupled to the shaft, in particular a saw blade, milling cutter or grinding wheel, a strain gauge arrangement for detecting a mechanical quantity dependent on a force emanating from the tool, and a control device adapted to recognize an event and/or a state of the power tool according to the detected mechanical quantity.

BACKGROUND OF THE INVENTION

WO 2014/105935 describes a table saw with a kickback detection system comprising a sensor located between a bearing and a shaft. The sensor can be designed as a strain gauge.

SUMMARY OF THE INVENTION

It is an object of the invention to modify the power tool mentioned at the beginning in such a way that it can be manufactured more easily.

The object is solved by a power tool according to claim 1. According to the invention, the strain gauge arrangement is arranged on a stationary structure section which is coupled to the pivot bearing in a force-transmitting manner. The strain gauge arrangement is not arranged on the pivot bearing.

The term "stationary structure section" shall refer in particular to a structure section that is stationary relative to the shaft; i.e. a structure section that does not rotate with the shaft.

The invention is based in particular on the finding that the force emanating from the tool is not only directly detectable at the pivot bearing itself, but in particular can also be detected at a stationary structure section coupled to the pivot bearing in a force-transmitting manner. Accordingly, the strain gauge is not arranged directly on the pivot bearing—which would be technically complex to manufacture—but is instead attached to the stationary structure section.

The strain gauge arrangement is expediently spaced apart from the pivot bearing.

In a preferred embodiment, the structure section is a section of the support structure on which support structure the pivot bearing is arranged. The structure section can be, for example, a bearing flange in which the pivot bearing is inserted and against which the pivot bearing abuts directly. Expediently, the strain gauge arrangement is arranged on a radially outwardly facing surface of the bearing flange, the surface facing away from the pivot bearing, and/or is arranged spaced apart from the pivot bearing on a radially inwardly facing surface of the bearing flange. It has been found that at this point forces emanating from the tool can be detected by the strain gauge arrangement well enough to be able to recognize the event and/or the state of the power tool.

According to another preferred embodiment, the structure section is a section of a gearbox housing and the pivot bearing abuts directly against the gearbox housing. Expediently, the strain gauge arrangement is arranged on a radially outwardly facing surface of the gear housing facing away from the pivot bearing and/or a radially inwardly facing surface of the gear housing.

The state to be determined by the control device is in particular a so-called "kickback" of the power tool. The term "kickback" typically refers to an event in which, while the power tool is machining a workpiece, a sudden and unexpected force occurs between the power tool and the workpiece, which then accelerates and sets the power tool or the workpiece in motion. With circular table saws, a kickback usually leads to an unexpected acceleration of the workpiece in the direction of the user. With circular hand saws, a kickback can cause unexpected movements of the tool. Kickbacks can lead to injuries to the user and therefore represent an impairment of the operational safety.

A kickback can in particular occur when the tool is being plunged too quickly and jerkily into the workpiece, when sawing backwards, when the tool is jammed in the workpiece, when specific workpiece properties (e.g. inhomogeneous wood, stresses) are given and/or when the tool is blunt. The event recognition on the basis of the detected mechanical quantity, as described above, in particular serves to detect a kickback event. The kickback or kickback event to be detected here means in particular an imminent kickback, i.e. an event in which the causes of the kickback are already present but no or no significant acceleration of the power tool and/or the workpiece has yet taken place. Before the power tool or the workpiece is set in motion or is significantly accelerated by the kickback, the kickback already announces itself by the force emanating from the tool changing its direction. The tool thus urges shortly before a kickback or at the beginning of a kickback in a different direction than in normal operation. This urging in a different direction can be detected by measuring the mechanical quantity in order to thus infer that a kickback state is present.

Furthermore, the event to be recognized can be a plunging of the tool into the workpiece, a forward sawing or a backward sawing.

The state to be recognized is, in particular, a state of wear of the power tool, preferably a state of wear of the tool designed in particular as a saw blade.

Advantageous further embodiments are defined in the dependent claims.

The invention further relates to a method for recognizing an event and/or a state of a power tool.

Expediently, the method is carried out with a power tool described here.

BRIEF DESCRIPTION OF THE DRAWINGS

Further exemplary details and exemplary embodiments are explained below with reference to the figures. Thereby shows FIG. 1 a schematic illustration of a power tool according to a first embodiment, FIG. 2 a sectional view of a shaft, a pivot bearing and a support structure of a power tool according to a second embodiment, FIG. 3 a sectional view of a power tool according to the second embodiment, FIG. 4 a bearing flange of a power tool according to the second embodiment, FIG. 5 a sectional view of a shaft, a pivot bearing and a support structure of a power tool according to a third embodiment, FIG. 6 a sectional view of a power tool according to the third embodiment, FIG. 7 a sectional view of a power tool according to a fourth embodiment, FIG. 8 a diagram illustrating an event and/or state recognition based on a direction or a change of direction of a mechanical vector quantity, FIG. 9 a block diagram of a method, and FIG. 10 a schematic illustration of a power tool according to a fifth embodiment.

DETAILED DESCRIPTION OF THE INVENTION

In the following explanation, reference is made to the directions "x", "y", "z" shown in the figures. The x-direction, y-direction and z-direction are orthogonal to each other. The x-direction and y-direction can also be referred to as horizontal directions and the z-direction as a vertical direction. Furthermore, in relation to the shaft 8, the y-direction and the z-direction can be referred to as radial directions and the x-direction as an axial direction.

Figure 1:
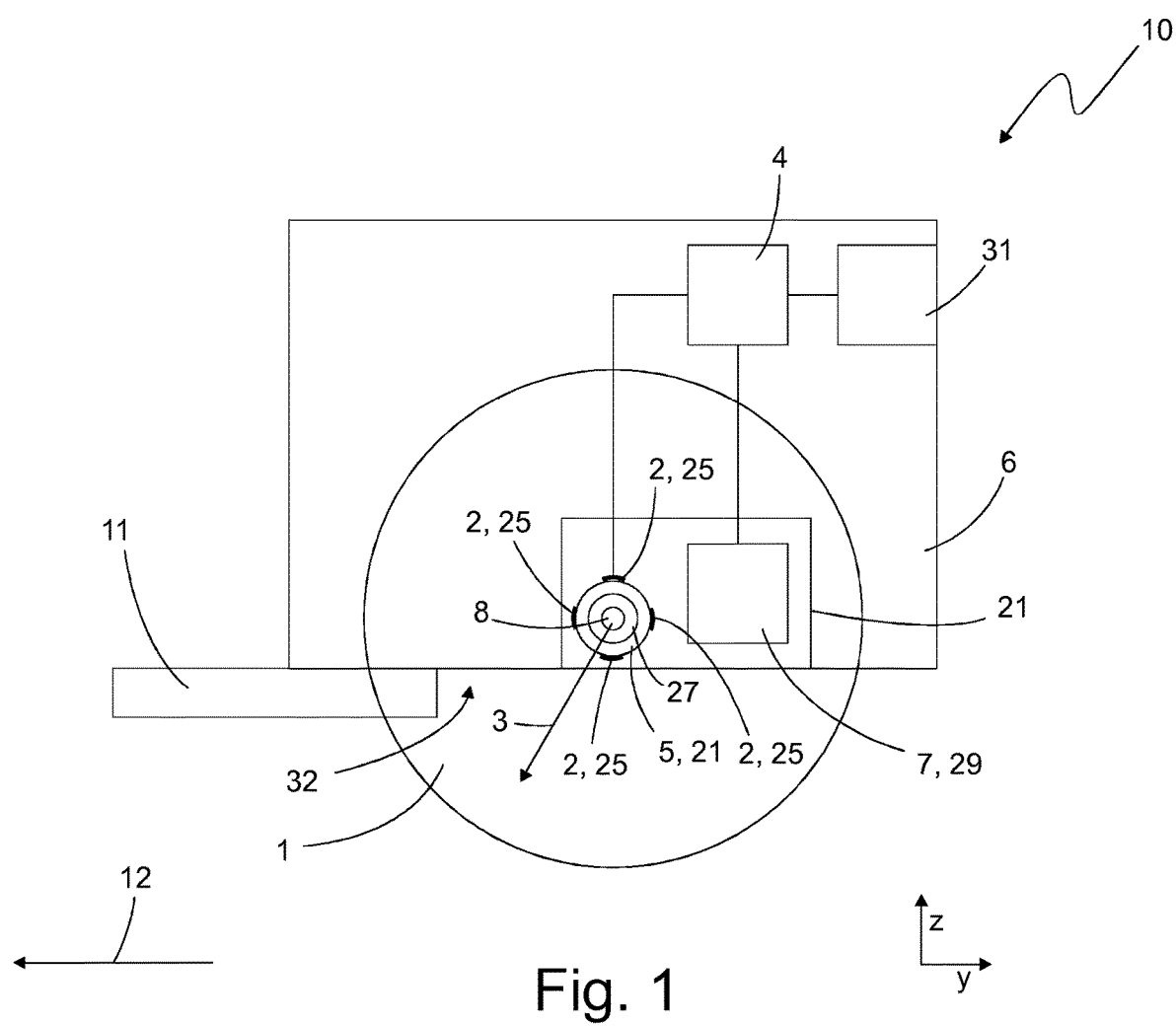

FIG. 1 shows a power tool 10 according to a first embodiment. The power tool 10 comprises a support structure 21 and a pivot bearing 27 arranged on the support structure 21. The pivot bearing 27 is preferably attached to and/or supported by the support structure 21. Expediently, the pivot bearing 27 is in direct contact with the support structure, for example with its outer ring 33 explained below and/or a coupling structure (not shown in the figures) arranged on the outer ring 33.

The power tool 10 also has a shaft 8, for example an input or output shaft, which is rotatably mounted on the support structure 21 via the pivot bearing 27. The support structure 21 preferably does not rotate with the shaft 8 and can also be described as a stationary structure.

The power tool 10 also has a rotatable tool 1, in particular a saw blade, milling cutter or grinding wheel, coupled to the shaft 8.

The power tool 10 has a strain gauge arrangement 2 for detecting a mechanical quantity 3, which depends on a force exerted by the tool 1. The strain gauge arrangement 2 is arranged on a stationary structure section 5, which is coupled to the pivot bearing 27 in a force-transmitting manner. The strain gauge arrangement is not arranged on the pivot bearing 27.

Furthermore, the power tool 10 comprises a control device 4, which is adapted to recognize an event and/or a state of the power tool 10 according to the detected mechanical quantity 3.

In the following, exemplary details of the power tool 10 and further exemplary embodiments are explained.

The power tool 10 is preferably a saw, in particular a hand-held circular saw or a plunge saw. The power tool 10 can also be designed as a flat dowel milling machine or as an angle grinder. The tool 1 is in particular circular and rotates clockwise in operation, for example.

Exemplariy, the power tool 10 has a housing 6, in which in particular the strain gauge arrangement 2 and the control device 4 are arranged. A contact surface 32 is provided on the housing 6, with which the power tool 10 can be placed on a workpiece 11 to be machined.

The power tool 10 has a drive device 7, which includes, for example, an electric motor and a gearbox. The drive device 7 is preferably controlled by the control device 4. The power tool 10 also has the shaft 8, which can be driven by the drive device 7. The shaft 8 is aligned with its axial direction in the x-direction. The tool 1 is mechanically coupled to the shaft 8. Expediently, the tool 1 is attached to the shaft 8.

The power tool 10 further has the support structure 21, which is expediently located in the housing 6. The shaft 8 is mounted on the support structure 21. Furthermore, the support structure 21 can be designed as a housing for the drive device 7. The support structure 21 may, for example, represent or comprise a drive housing, in particular a gearbox housing.

Exemplarily, the power tool 10 is also equipped with a user interface 31. The user interface 31 comprises for example an input device that allows the user to switch the power tool 10 on and off and/or to configure and/or to calibrate it.

As shown in FIG. 1, when machining the workpiece 11, the power tool 10 typically sits on the workpiece 11 with the contact surface 32 and is moved in a feed direction 12 relative to the workpiece 11. Exemplarily, the saw teeth of the tool 1 saw from bottom to top into the workpiece 11.

The strain gauge arrangement 2 is coupled to the shaft 8 via the support structure 21 and the pivot bearing 27 in a force-transmitting manner. The strain gauge arrangement 2 is especially designed to detect, as the mechanical quantity 3, a deformation of the structure section 5 caused by a force emanating from the tool 1. The strain gauge arrangement 2 is preferably laser structured.

In FIG. 1, the structure section 5 is exemplarily part of the support structure 21. The structure section 5 is exemplarily ring-shaped and/or cylindrical. Expediently, the structure section 5 carries the pivot bearing 27.

Alternatively, it is also possible that the structure section 5 itself is not part of the support structure 21, i.e. it in particular does not carry the pivot bearing 27. In this alternative case, the structure section 5 is expediently located directly on the support structure 21. In this case, the structure section 5 preferably reaches around the support structure 21 and/or is in particular placed onto the support structure 21.

The pivot bearing 27 is preferably arranged directly on the support structure 21. Expediently, the pivot bearing 27 is attached directly to the support structure 21. The pivot bearing 27 has an outer ring 33, as explained below, and is attached in particular with the outer ring 33 (and/or a coupling structure not shown) to the support structure 21. Preferably the support structure 21 reaches around the pivot bearing 27.

Expediently, the strain gauge arrangement 2 is arranged on a surface of the structure section 5, which surface is facing away from the pivot bearing 27 and/or is directed radially outwards, as shown in FIG. 1 as an example. Alternatively, the strain gauge arrangement 2 can be located spaced apart from the pivot bearing 27 on a radially inward facing surface of the structure section 5.

As an example, the strain gauge arrangement 2 comprises several strain gauges 25, which are distributed on an (imaginary) path running around the shaft 8. The (imaginary) path is preferably circular. The strain gauges 25 are spaced apart, especially at equal angular distances. As an example, the strain gauges 25 are spaced 90 degrees apart.

As an alternative to the embodiment shown, it is also possible that the strain gauge arrangement 2 comprises exactly one strain gauge 25; i.e. that there is only one strain gauge 25 on the structure section 5 and/or the support structure 21. The strain gauge 25 is then preferably located in an angular range that serves as an indicator of the event or state to be recognized, for example in one of the directional ranges 14, 15, 16 explained below (see FIG. 8).

Preferably, the strain gauge arrangement 2 and/or the control device 4 is designed to continuously detect the mechanical quantity 3, so that a change, in particular a change in direction, of the mechanical quantity 3 can be detected.

The control device 4 is designed as a microcontroller, for example. The control device 4 is communicatively coupled with the strain gauge arrangement 2, which can also be referred to as a sensor device. The control device 4 is adapted to determine an event and/or a state of the power tool 10 based on the mechanical quantity 3. For example, the control device 4 is adapted to determine whether the direction of the detected mechanical quantity 3 is within or outside a specific directional range and to decide on the basis of this determination whether a specific state and/or event is present or not.

In addition or alternatively, the control device 4 may also be adapted to compare the mechanical quantity 3, in particular the magnitude of the mechanical quantity 3, with a threshold and to decide on the basis of the comparison whether or not a specific state and/or event is present. In this case the mechanical quantity 3 can be detected as a scalar quantity.

Preferably, the control device 4 is adapted to selectively determine, based on a function determination information, a first recognition function or a second recognition function different from the first recognition function and to perform the recognition of the kickback event based on the detected mechanical quantity using the determined recognition function. The two recognition functions expediently differ in their sensitivity.

With reference to FIGS. 2 to 7, exemplary embodiments will be discussed below, which pertain to different designs of the structure section 5 or the location of the strain gauge arrangement 2 on the structure section 5. The embodiments explained below are expediently further developments of the first embodiment described above, so that the above explanations also apply to the embodiments explained below.

According to a second embodiment, the support structure 21 includes a bearing flange 9 and the structure section 5 is part of the bearing flange 9. The strain gauge arrangement 2 is located on the bearing flange 9.

Figure 2:
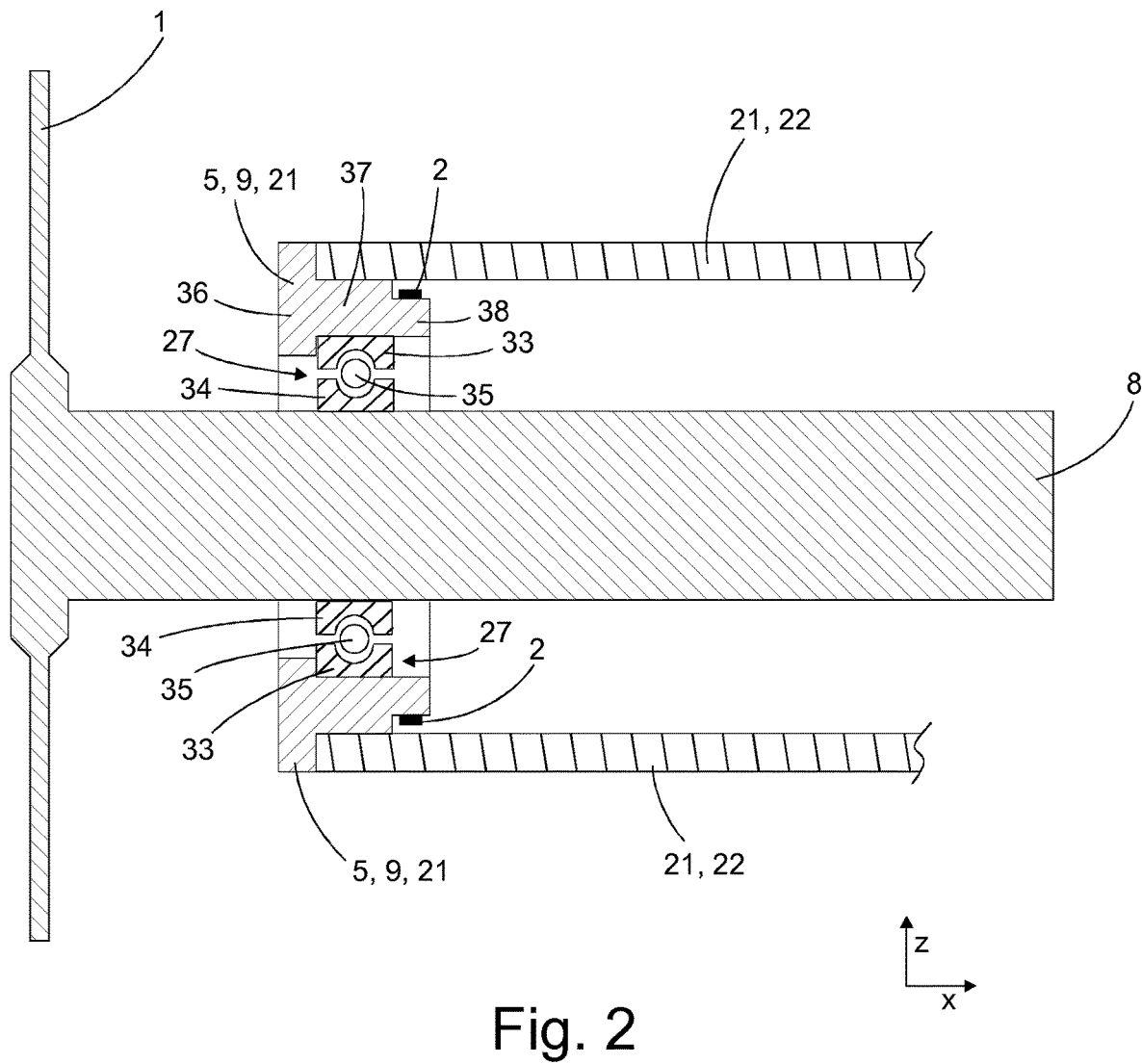
Figure 3:
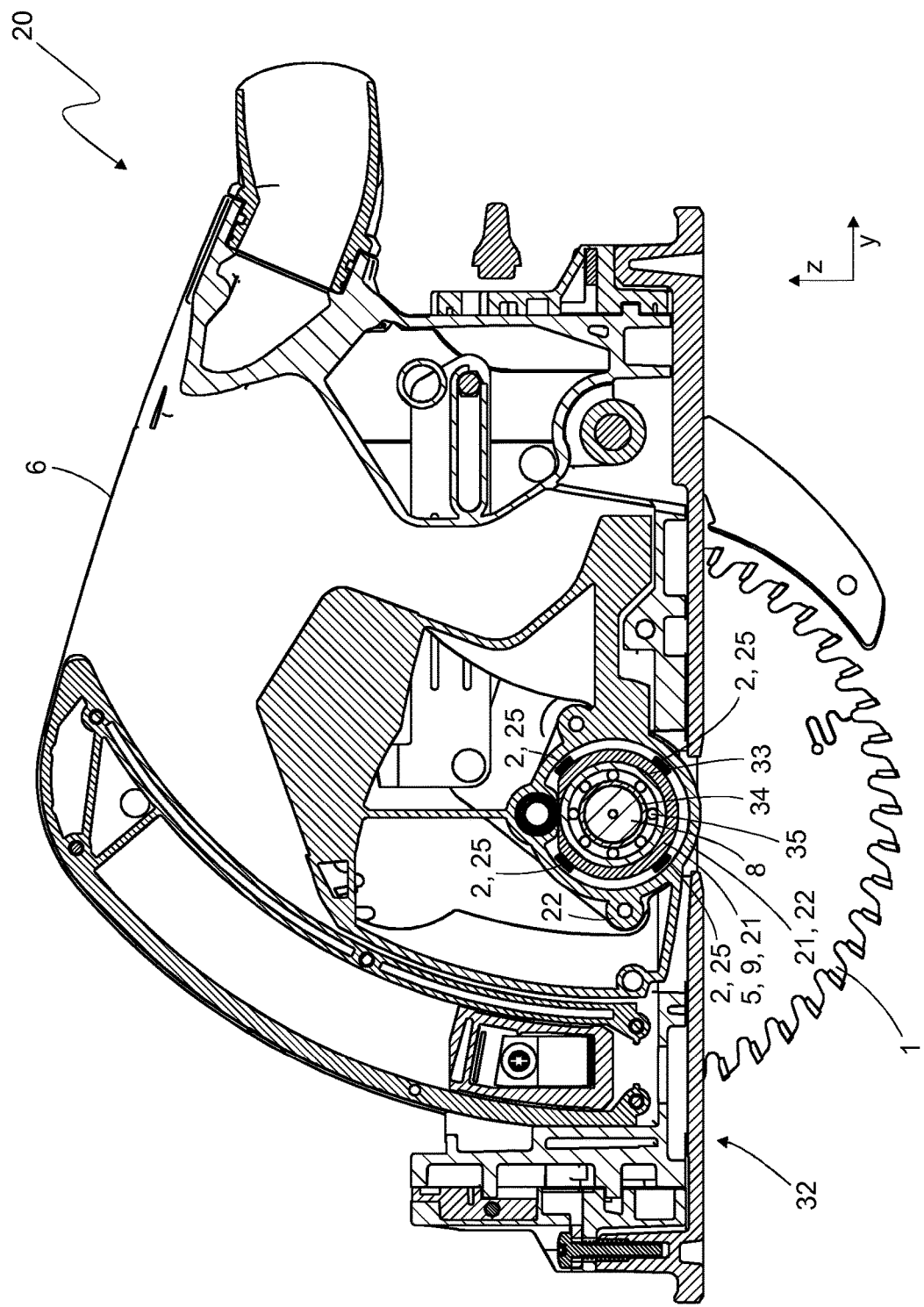
Figure 4:
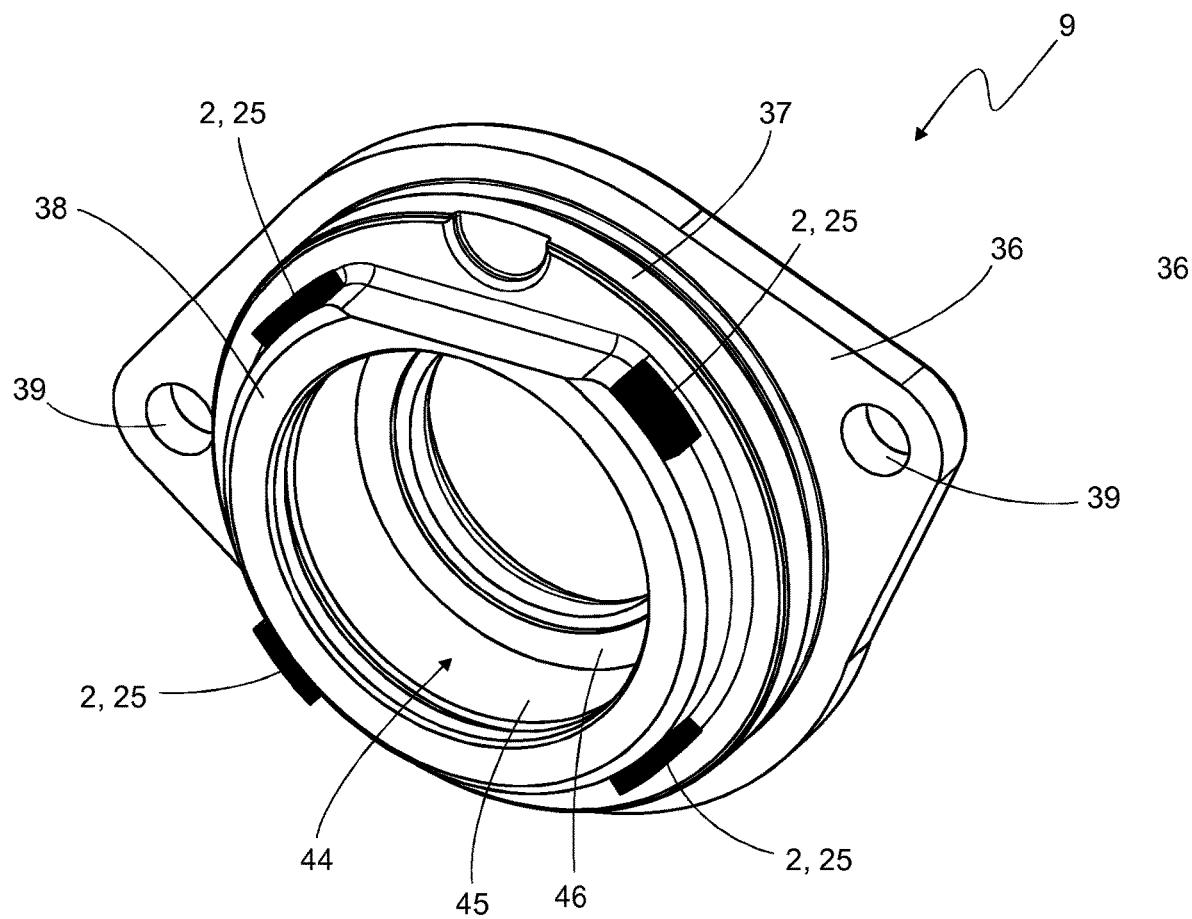

An exemplary design of the second embodiment is shown in FIGS. 2, 3 and 4. FIG. 3 shows a power tool 20 designed according to the second embodiment.

In this example, the pivot bearing 27 is arranged directly on the bearing flange 9. The bearing flange 9 embraces the pivot bearing 27; the pivot bearing 27 is in particular in contact with a radially inward facing surface of the bearing flange 9. The strain gauge arrangement 2 is arranged on a surface of the bearing flange 9, which is surface is facing away from the pivot bearing 27 and is directed radially outwards.

According to a design not shown, the strain gauge arrangement 2 can also be arranged at a distance from the pivot bearing 27 on a radially inward facing surface of the bearing flange 9.

The bearing flange 9 has a pivot bearing receptacle 44 in the form of a cylindrical recess. The pivot bearing receptacle 44 comprises, for example, a radially inwardly directed inner surface 45, which can also be referred to as the inner circumferential surface, and an annular contact surface 46, aligned perpendicular to the axial direction, which annular contact surface 46 limits the pivot bearing receptacle 44 in the axial direction. In a state in which the pivot bearing 27 is inserted, the outer ring 33 of the pivot bearing 27 is in contact with the inner circumferential surface 45 and the end face of the bearing 27 is in contact with the contact surface 46.

Expediently, the bearing flange 9 has an annular basic shape and has a circular opening through which the shaft 8 passes. The inner diameter of the bearing flange 9 is expediently larger than the outer diameter of the shaft 8, so that the shaft 8 and the bearing flange 9 preferably do not touch each other. The bearing flange 9 is preferably a one-piece part.

The bearing flange 9 has several axial sections adjoining each other in the axial direction of the shaft 8, each of which axial sections has an annular basic shape. For example, the bearing flange comprises as axial sections a flange section 36, a pivot bearing receptacle section 37 and a collar section 38.

The flange section 36 has in radial direction—i.e. in y-direction and in z-direction—the largest dimension of the axial sections. Furthermore, the flange section 36 is exemplarily the axial section with the smallest inner diameter. The flange section 36 includes mounting sections 39 (shown in FIG. 4), via which the bearing flange 9 is attached to the first subsection 22, as explained below.

The flange section 36 is followed in the axial direction by the pivot bearing receptacle section 37, in which the pivot bearing receptacle 44 is located. The pivot bearing receptacle section 37 has a smaller outer diameter and/or a larger inner diameter than the flange section 36.

The collar section 38 follows the pivot bearing receptacle section 37 in the axial direction. The collar section 38 can also provide part of the axial extension of the pivot bearing receptacle 44. The collar section 38 exemplarily has a smaller outside diameter than the pivot bearing receptacle section 37 and/or the same inside diameter as the pivot bearing receptacle section 37.

Exemplarily, the strain gauge arrangement 2 is arranged on the collar section 38, in particular on the radially outwardly directed outer surface of the collar section 38. Expediently, the collar section 38 is the structure section 5.

According to a design not shown, the strain gauge arrangement 2 can also be arranged on an inwardly directed circumferential surface of the bearing flange 9, in particular of the collar section 38.

Exemplarily, there are four strain gauges 25 distributed around the circumference of the collar section 38. Alternatively, there may be exactly one, two or three strain gauges 25 or more than four strain gauges 25.

As shown in FIG. 2, the bearing flange 9, together with a first subsection 22, forms the support structure 21. The first subsection 22 is expediently part of the gearbox housing. As an example, the first subsection 22 has a hollow cylindrical shape and expediently encloses the shaft 8, the first subsection 22 preferably being spaced apart from the shaft 8.

The bearing flange 9 is in particular attached to one end of the first subsection 22. Expediently, the bearing flange 9 is attached via the flange section 36, in particular via the mounting sections 39, to the first subsection 22, in particular to the gearbox housing. For example, the mounting sections 39 have holes through which a fastener, such as a bolt, reaches to attach the bearing flange 9 to the first subsection 22.

Exemplarily, the first subsection 22 with its inner circumferential surface is in contact with the outer circumferential surface of the bearing flange, in particular of the pivot bearing receptacle section 37. Expediently, the inner circumferential surface of the first subsection 22 lies opposite to the outer circumferential surface of the collar section 38 and is radially spaced apart from the collar section 38 and in particular from the strain gauge arrangement 2.

The pivot bearing 27 abuts with its outer ring 33 against the inner surface of the bearing flange 9 and is preferably mounted non-rotatably on the bearing flange 9. The pivot bearing 27 comprises rolling elements 35 as well as an inner ring 34, which is mounted so as to be rotatable relative to the outer ring 33 via the rolling elements 35. The shaft 8 is mounted on the inner ring 34.

In a variant of the second embodiment, the strain gauge arrangement 2 may also be arranged on the first subsection 22, in particular on a radially outwardly and/or radially inwardly directed surface, for example a circumferential surface, of the first subsection 22. Furthermore, the strain gauge arrangement 2 may also be located on a structure section embracing the bearing flange 9 and/or the first subsection 22.

Figure 5:
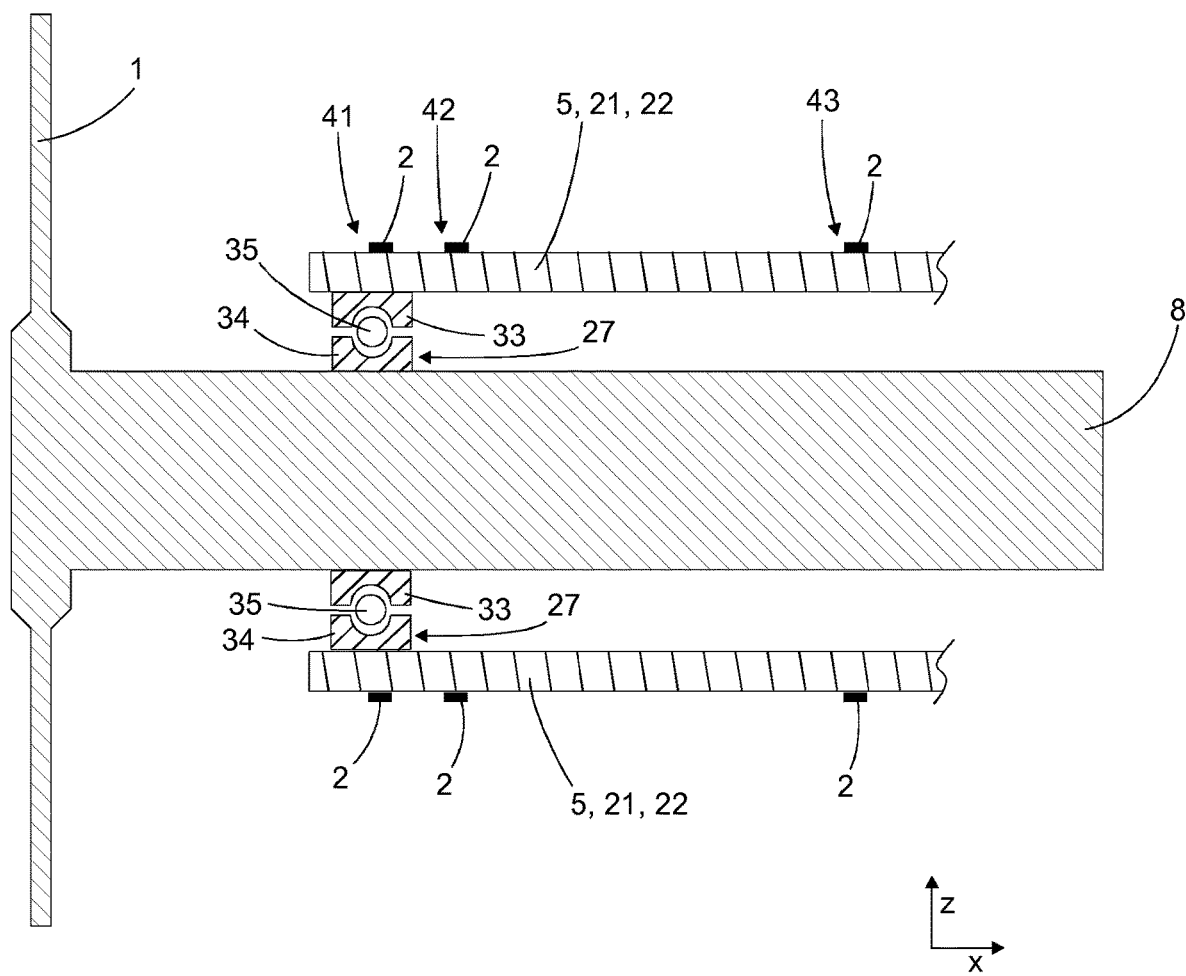
Figure 6:
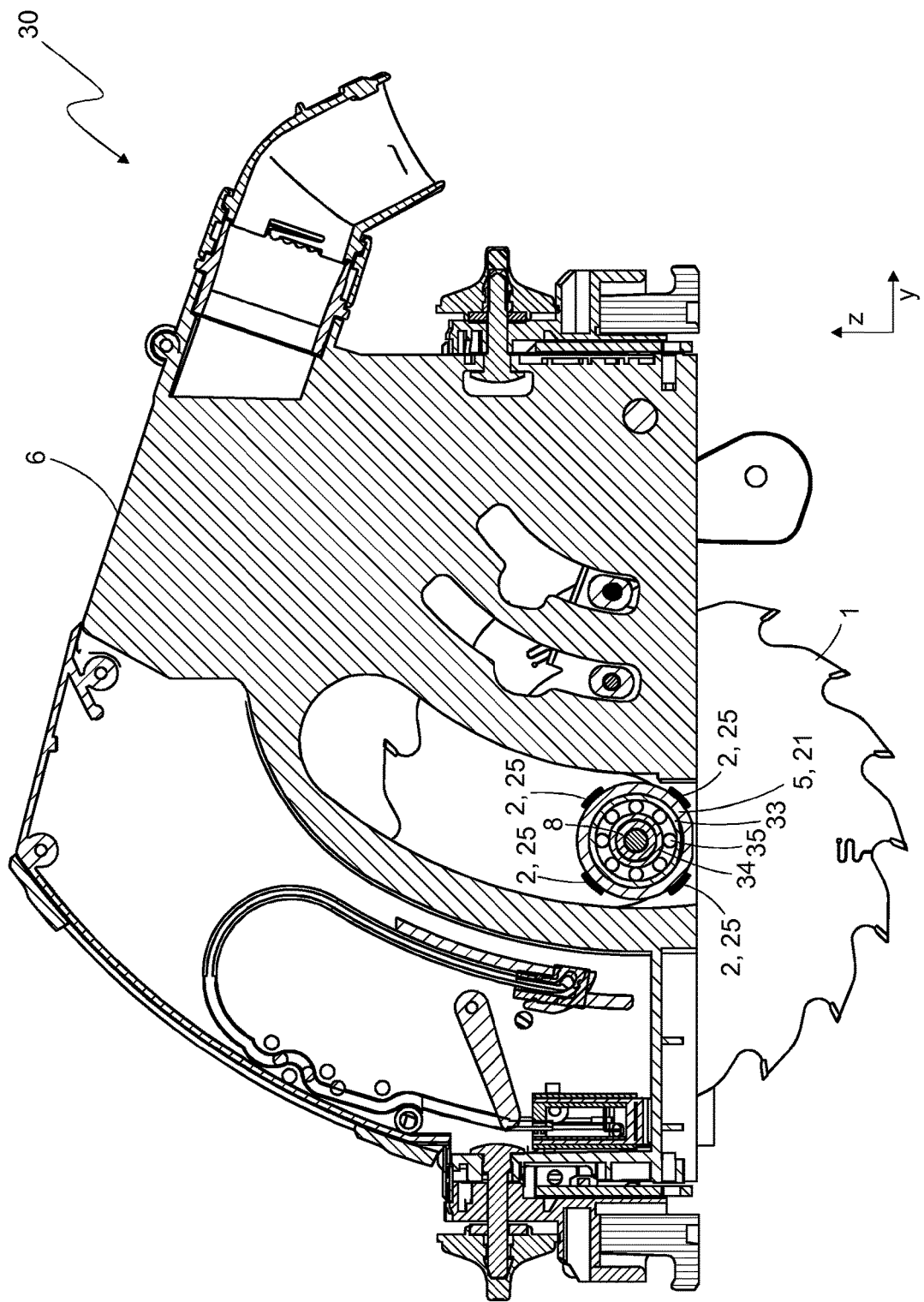

According to a third embodiment, the strain gauge arrangement 2 is arranged on the support structure 21. The pivot bearing 27 is expediently not arranged on a bearing flange but instead on an exemplary ring-shaped or hollow cylindrical section of the support structure 21, which section can also be referred to as the first subsection 22. The third embodiment is shown in FIGS. 5 and 6; FIG. 6 shows a power tool 30 designed according to the third embodiment.

As an example, the third embodiment can be designed like the second embodiment, with the difference that the bearing flange 9 is not present, the pivot bearing abuts directly against the first subsection 22 and the strain gauge arrangement 2 is located on the first subsection 22. Expediently, the strain gauge arrangement 2 is arranged on a surface of the support structure 21, in particular of the first subsection 22, facing away from the pivot bearing 27 and/or facing radially outwards. Alternatively or in addition, the strain gauge arrangement 2 may also be arranged on a radially inward facing surface of the support structure 21, in particular of the first sub-section 22.

The pivot bearing 27 exemplary abuts directly against the support structure 21, especially against the first subsection 22. A radially inwardly facing circumferential surface of the support structure 21, in particular of the first subsection 22, abuts against a radially outwardly facing surface of the pivot bearing 27, in particular of the outer ring 33.

The support structure 21, in particular the first subsection 22, is preferably a section of the gear housing, which preferably also supports the drive device 7. The structure section 5 is thus provided by the gearbox housing.

As can be seen in FIG. 5, the strain gauge arrangement 2 can be arranged in different axial regions 41, 42, 43 relative to the pivot bearing 27. Preferably, the strain gauge arrangement 2 is only arranged in one of the axial regions 41, 42, 43, but can also be arranged in several axial regions 41, 42, 43.

As an example, the strain gauge arrangement 2 is arranged, in the axial direction of the shaft 8, in the same first axial region 41 as the pivot bearing 27. Alternatively or in addition, the strain gauge arrangement 2 may also be located in a second axial region 42 adjacent to the first axial region 41 and/or in a third axial region 43 spaced apart from the first axial region 41.

The strain gauge arrangement 2 is arranged in FIG. 5 in the different axial regions 41, 42, 43, respectively on a radially outwardly directed surface of the first subsection 22, but can also be arranged on a radially inwardly directed surface, in particular on the same surface as the pivot bearing 27.

Expediently, these arrangement options also apply to the other embodiments.

In a variant of the third embodiment, the strain gauge arrangement 2 is arranged on a structure section that embraces the first subsection 22.

Figure 7:
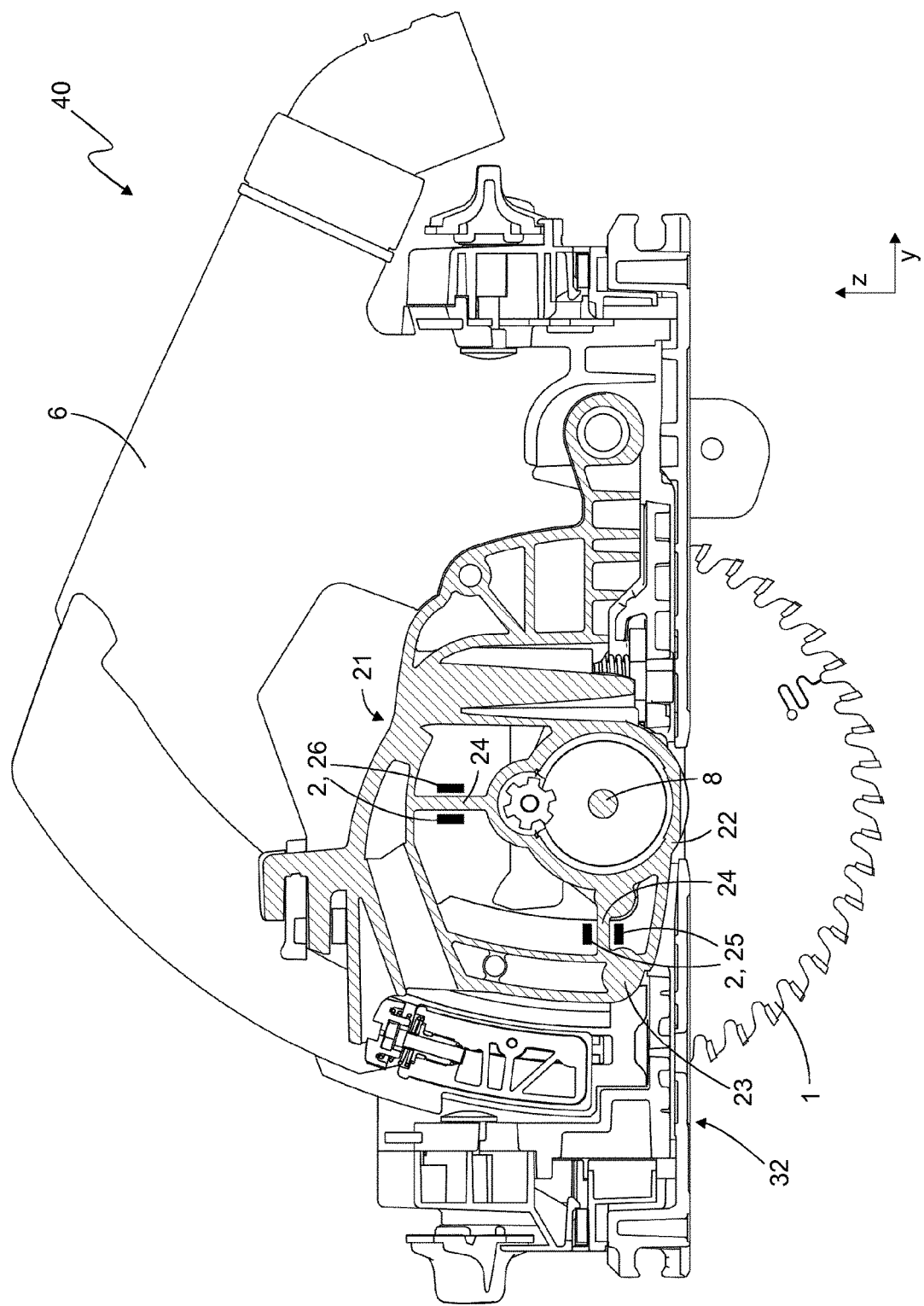

FIG. 7 shows a power tool 40 according to a fourth embodiment. In the fourth embodiment, the strain gauge arrangement 2 comprises several strain gauges 25, 26 which are arranged on the support structure 21. For example, the strain gauges are glued to the support structure 21 or are laser structured.

The strain gauges 25, 26 serve to detect a deformation of the support structure 21 caused by a force exerted by the shaft 8 on the support structure 21.

Expediently, the strain gauges 25, 26 are arranged on two sections 24 of the support structure 21, which sections 24 extend radially outwards relative to the shaft 8. For example, the strain gauge 25 is arranged on a horizontal section 24, and the strain gauge 26 is arranged on a vertical section 24. The sections 24 are especially bar-shaped.

The sections 24 connect a first subsection 22 and a second subsection 23 of the support structure 21 with each other. As an example, the first subsection 22 surrounds the shaft 8. In particular the first subsection 22 represents or comprises a gear housing. Preferably, the shaft 8 is mounted on the first subsection 22. The second subsection 23 is located in the force flow emanating from the tool 1 behind the first subsection 22, i.e. downstream of the first subsection 22.

Expediently, one of the above explained components comprising the structure section 5 is provided as a retrofit arrangement to retrofit a power tool, in particular a fully functional power tool. The tool is preferably a saw, a flat dowel milling machine or an angle grinder. In particular, the above explained bearing flange 9, the support structure 21 and/or the first subsection 22 can be provided as a retrofit arrangement.

Such a retrofit arrangement serves for retrofitting a power tool comprising a support structure 21, a pivot bearing 27 arranged on the support structure 21, a shaft 8 mounted on the support structure 21 via the pivot bearing 27 and a rotatable tool 1 coupled to the shaft 8, in particular a saw blade, milling cutter or grinding wheel, wherein the retrofit arrangement has a structure section 5 on which a strain gauge arrangement 2 is arranged, and the retrofit arrangement is designed in such a way that the structure section 5 can be installed as a stationary structure section coupled in a force-transmitting manner to the pivot bearing 27, so that the strain gauge arrangement 2 is not arranged on the pivot bearing 27.

In particular, the retrofit arrangement shall be designed in such a way that by its installation a configuration as shown in FIG. 2 or 5 can be achieved.

The power tool, especially the fully functional power tool, can be retrofitted with the retrofit arrangement by the following step: installing the retrofit arrangement so that the structure section 5 in the power tool is a stationary structure section coupled in a force-transmitting manner to the pivot bearing 27 and the strain gauge arrangement 2 is not arranged on the pivot bearing 27.

Furthermore, the following step can be carried out during retrofitting, especially before the above mentioned step: Removing a structure section coupled in a force-transmitting manner to the pivot bearing 27, in particular a bearing flange, a support structure and/or a first subsection of the support structure.

In the following, the detection and evaluation of the mechanical quantity 3 as a vector quantity will be described in more detail. The following explanations apply to all embodiments.

Expediently, the strain gauge arrangement 2 is adapted to detect the mechanical quantity as a mechanical vector quantity and the control device 4 is adapted to recognize the event and/or the state of the power tool 10, 20, 30, 40, 50 according to a direction and/or a change of direction of the mechanical vector quantity 3.

Since the event and/or state recognition of the power tool 10 is based on a direction and/or change of direction of a detected mechanical vector quantity 3, an event or a change of state of the power tool 10 may be detected at a very early stage. The event and/or state recognition is thus improved.

As an example, the strain gauge arrangement 2 comprises several strain gauges 25, each of which is used to detect a deformation of the structure section 5. A deformation vector can be formed from the detected deformations of various strain gauges 25, which deformation vector preferably serves as the mechanical vector quantity. From the direction of the mechanical vector quantity, the force emanating from the tool 1 may be inferred, or it may be recognized in which direction the tool 1 is urging, especially relative to another component of the tool 1, for example the housing 6. Preferably, the direction of the detected mechanical vector quantity corresponds to the direction in which the tool 1 urges.

By means of FIG. 8 it shall be explained in the following in detail how the recognition of a specific event and/or state can be exemplarily performed.

Figure 8:
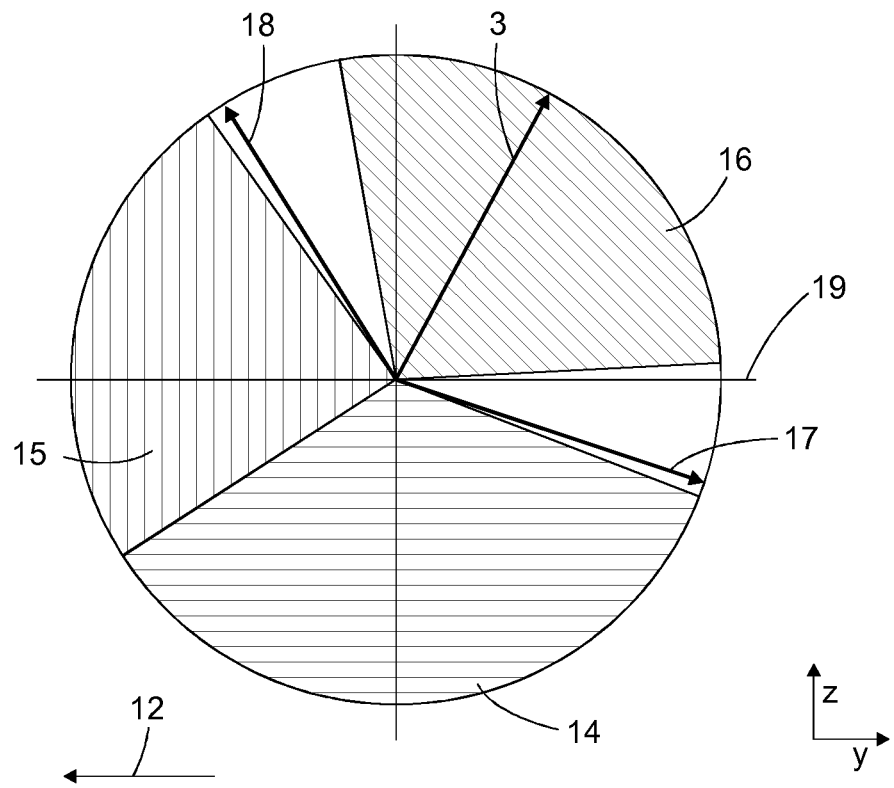

FIG. 8 shows a diagram with different directional ranges 14, 15 and 16, two directional thresholds 17, 18 and the detected mechanical vector quantity 3.

The diagram is divided into four quadrants. Each quadrant covers 90 degrees. The reference sign 19 indicates the zero degree line. The angle coordinates or degrees mentioned below are to be understood in the mathematically positive direction of rotation (counter-clockwise). Expediently, the zero degree line runs parallel to the contact surface 9 and/or to the feed direction 12.

The directional ranges 14, 15 and 16 are exemplary two-dimensional directional ranges. The directional ranges 14, 15 and 16 can also be called angular ranges.

Expediently, the directional ranges 14, 15, 16 lie in one plane. The plane is expediently aligned parallel to the plane of the tool 1 or perpendicular to the axial direction of the shaft 8. The directional ranges 14, 15, 16 preferably do not overlap each other.

The control device 4 is adapted to provide at least one directional range 14, 15 or 16. For example, the at least one directional range is stored in a memory in the control device 4. Alternatively or in addition to this, the control device 4 can also be adapted to generate the at least one directional range itself. The control device 4 is further adapted to determine whether the detected mechanical vector quantity 3 lies within or outside of the directional range 14, 15 or 16 and, based on this determination, to recognize the state of the power tool 10.

Expediently, the control device 4 is adapted to provide a plurality of directional ranges 14, 15, 16 and to recognize different events and/or states based on which of the directional ranges 14, 15, 16 the direction of the mechanical vector quantity 3 is located. In particular, a respective event and/or state is assigned to each of the directional ranges 14, 15, 16.

The first directional range 14 represents a directional range in which the mechanical vector quantity 3 is located when the tool 1 is immersed in the workpiece 1 and the power tool 10 is moved relative to the workpiece 1 in the feed direction 12. As an example, the first directional range 14 is located in the two lower quadrants, i.e. within a range between 180 degrees and 360 degrees. In the example shown, the first directional range 14 extends from 220 degrees to 330 degrees.

A mechanical vector quantity 3, which lies in the first directional range 14, is an indicator that the event or state exists that a sawing the with power tool 10 in the feed direction 12 forward takes place. Accordingly, the control device 4 is adapted to recognize that a "forward sawing event" or "forward sawing state" is present if the mechanical vector quantity 3 is in the first directional range 14.

The second directional range 15 represents a directional range in which the mechanical vector quantity is located when the tool 1 is immersed in the workpiece 11 and the power tool 10 is moved relative to the workpiece 11 in the opposite direction to the normal feed direction 12—i.e. in the reverse direction. Furthermore, the second directional range 15 represents a directional range where the mechanical vector quantity 3 is located when the tool 1 is being plunged into the workpiece 11. As an example, the second directional range 15 is located in the two left quadrants, i.e. within a range between 90 degrees and 270 degrees. In the example shown, the second directional range 14 extends from 125 degrees to 220 degrees.

A mechanical vector quantity 3, which is in the second directional range 15, is an indicator of the event or state that the power tool 10 is sawing backwards or that tool 1 is being plunging into the workpiece 11. Accordingly, the control device 4 is adapted to detect that a "reverse sawing event" or a "reverse sawing state" or a "plunging event" is present if the mechanical vector quantity 3 is in the second directional range 15.

The first directional range 14 and the second directional range 15 together represent a normal range. As long as the mechanical vector quantity 3 is within the normal range, the control device 4 can assume that a safe operation of the power tool 10 is present and, for example, provide an corresponding signal.

The third directional range 16 represents a directional range in which the mechanical vector quantity lies when a kickback event occurs. As an example, the third directional range 16 is located in the two upper quadrants, i.e. within a range between 0 degrees and 180 degrees. In the example shown, the third directional range 16 extends from 5 degrees to 100 degrees. Expediently, the control device 4 is adapted to recognize the kickback event if the mechanical vector quantity 3 is in the third directional range 16.

The directional range in which the control device 4 infers a kickback event can also be defined larger. For example, the boundaries of this directional range can be placed between the boundaries of the normal range and the boundaries of the third directional range 16. This is illustrated in FIG. 8 by the two directional thresholds 17, 18. As an example, the directional thresholds 17, 18 are adjacent to the limits of the normal range. Alternatively, the directional thresholds may be located on the boundaries of the normal range.

Expediently, the directional range extending clockwise from the second directional threshold 18 to the first directional threshold 17 may be used instead of the third directional range 16. The third directional range 16 (shown in FIG. 2) is optional in this case.

The control device 4 is expediently adapted to detect the kickback event if the mechanical vector quantity 3 lies between the two directional thresholds 17, 18—i.e. counterclockwise behind the first directional threshold 17 and before the second directional threshold 18. The kickback event can thus be detected at a point in time when the cause of the kickback is already present, but the power tool 10 or the workpiece 11 have not yet been significantly accelerated or have not yet exerted any recoil. Expediently, the control device 4 is adapted to detect the kickback event 50 ms to 100 ms before an acceleration of the power tool 10 relative to workpiece 11 occurs (without recognition and response to the kickback). For example, the acceleration is an acceleration with one component upwards or one component in a 90 degree direction in the diagram shown.

As an alternative or in addition to the above described event and/or state recognition based on the direction of the detected mechanical vector quantity 3, it is also possible to perform the event and/or state recognition based on a change in direction of the mechanical vector quantity 3.

For example, if a kickback is imminent, the mechanical vector quantity 3 rotates towards the third directional region 16. The control device 4 may be adapted to recognize an event and/or state based on a detected rotation of the mechanical vector quantity 3. For example, the control device 4 is adapted to compare the angular velocity of the mechanical vector quantity with a velocity threshold and to recognize the event and/or state when the velocity threshold is exceeded. Furthermore, the control device 4 may be adapted to determine by which angle of change the mechanical vector quantity 3 has changed, in particular within a specific time window, and to compare this angle of change with an angle threshold in order to recognize the event and/or state.

For the kickback recognition, the control device 4 may further be adapted to distinguish between different types of kickback. For example, if a kickback is imminent, which kickback occurs during reverse sawing or plunging, the mechanical vector quantity 3 rotates counterclockwise (starting from the second directional area 15), while the mechanical vector quantity 3 rotates clockwise during a kickback caused by tool 1 being trapped in the workpiece 11. The control device 4 may be adapted to take into account the direction of rotation of the mechanical vector quantity 3 when recognizing the event and/or state.

Furthermore, the control device 4 may be adapted to take into account a magnitude of the detected mechanical vector quantity 3 for the state and/or event recognition. For example, the control device 4 may be adapted to recognize the state and/or event only if the magnitude of the mechanical vector quantity 3 is greater than a threshold. In this way, it is possible to prevent weak impacts occurring during operation from being falsely recognized as kickback.

In addition, the control device 4 may be adapted to take into account the time period during which the mechanical vector quantity 3 is within a specific directional range 14, 15, 16. For example, the control device 4 may be adapted to recognize the state and/or event only if the mechanical vector quantity is within a specific directional range 14, 15, 16 for longer than a specific time threshold.

Furthermore, the control device 4 may be adapted to determine whether a wear state exists based on the direction of the detected mechanical vector quantity 3. The wear state can in particular be a wear state of the tool 1. The control device 4 may be adapted to provide a directional range and to determine a wear state based on whether the mechanical vector quantity 3 is inside or outside the directional range. As an example, the control device 4 can detect a reversal of direction, for example a reversal of the direction of force, of the mechanical vector quantity 3 and infer from this reversal of direction the wear state. The control device 4 can then output an acoustic or visual signal via a corresponding signalling device to indicate that the wear state is present.

The specific angle figures of the directional ranges 14, 15, 16 explained above are to be understood purely as examples. Actual angles may vary depending on the type and construction of the power tool 10. The actual angles of the directional ranges 14, 15, 16 can be determined by calibration. Calibration can be carried out, for example, during the development or manufacture of the power tool and/or by the user.

Expediently, the control device 4 is adapted to calibrate one or more directional ranges 14, 15, 16. For example, the calibration can be initiated via the user interface 5. The control device 4 can then drive the tool 1 via the drive device 7 and, meanwhile, acquire the mechanical vector quantity 3 via the strain gauge arrangement 2. Based on the detected mechanical vector quantity 3, the control device 4 can then create a directional range and/or one or more thresholds and store them in a memory of the control device 4. This operation can be performed, for example, when a new tool 1 is mounted. The wear detection of the tool 1 can thus be improved.

In the following, the strain gauge arrangement 2 and the detection of the mechanical vector quantity 3 are discussed in detail.

The strain gauge arrangement 2 is adapted to detect the mechanical vector quantity 3 as at least two-dimensional vector. For this purpose, the strain gauge arrangement 2 is adapted to measure the mechanical quantity underlying the mechanical vector quantity 3 in at least two different spatial directions. The two spatial directions are, for example, a spatial direction parallel to the feed direction 12 and a spatial direction perpendicular to the feed direction 12. Expediently, both spatial directions are perpendicular to the axial direction of the shaft 8. For example, the strain gauge arrangement 2 has at least two strain gauges 25. Expediently, each of the strain gauges 25 serves to measure the underlying mechanical quantity—i.e. a force, an acceleration, a velocity, a deflection, a deformation and/or a mechanical stress—in a different spatial direction.

The mechanical vector quantity 3 is in particular a force vector, an acceleration vector, a velocity vector, a deflection vector, a deformation vector and/or a mechanical stress vector or stress tensor. Accordingly, the strain gauge arrangement 2 can be adapted to measure a force, an acceleration, a velocity, a deflection, a deformation and/or a mechanical stress in at least two directions in space.

Basically, the strain gauge arrangement 2 can be set up to measure the mechanical vector quantity 3 on a part within the force flow emanating from the tool 1. The force flow runs exemplarily from the tool 1 via the shaft 8, a bearing device 27, the support structure 21, the housing 6 and the contact surface 9 to the workpiece 11. In particular, the strain gauge arrangement 2 is adapted to measure the mechanical vector quantity 3 between two parts lying one behind the other in the force flow.

Alternatively, the mechanical vector quantity can be measured outside the force flow emanating from the tool 1.

In the following, different possibilities are discussed how it may be reacted to a recognized event and/or a recognized state. Expediently, each of these possibilities may be realized for each of the power tools discussed above.

Preferably, the control device 4 is adapted to provide a corresponding signal in response to the recognized event and/or state. The control device 4 may, for example, be adapted to store the signal in a memory and/or to output it via a signal output device, in particular an acoustic or visual signal output device, of the power tool. In particular, the stored signal may be a data recording where data acquired by the strain gauge arrangement 2 is recorded. For example, it is a data recording for the purpose of recording the circumstances of an accident.

Furthermore, the control device 4 can be adapted to perform a specific control of the drive device 7 in response to the recognized event and/or state, for example to cause the tool 1 to stop being driven and/or to brake, in particular to brake completely. This is especially useful if the detected event is a kickback event. In particular, braking can be carried out with the same electric motor that is otherwise used to drive tool 1.

Alternatively or additionally, the power tool may include a braking device and the control device may be adapted to control the braking device in response to the recognized event and/or signal so that the tool 1 is braked.

The control device 4 is expediently adapted to cause the tool 1 to be braked via the drive device 7 and/or the braking device in the event of a detected kickback event at a point in time at which no recoil of the power tool and/or workpiece 11 has yet occurred. For example, the braking may occur at a point in time when, returning to FIG. 2, the directional threshold 17 or 18 has already been exceeded, but the mechanical vector quantity 3 is preferably not yet in the third directional range 16. In this way, the recoil caused by the kickback can be reduced or completely prevented.

Furthermore, the power tool 10, 60 may include a positioning device 29 adapted to position the tool 1 either in an operating position or in a safety position. The control device 4 may be adapted to control the positioning device 29 in response to the recognized event and/or state so that the tool 1 is positioned in the operating position or the safety position. The positioning device 29 is adapted, for example, to move and/or swivel the tool 1 between the operating position and the safety position. Expediently, the tool 1 is positioned further into housing 6 in the safety position than in the operating position. Expediently, the tool 1 is positioned in the safety position in response to a kickback event.

Figure 9:
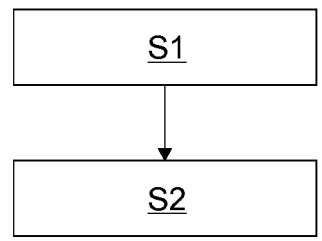

FIG. 9 shows a flow chart of a method for recognizing an event and/or state of a power tool 10, 20, 30, 40, 50 having a support structure 21, a pivot bearing 27 arranged on the support structure, a shaft 8 mounted on the support structure 27 via the pivot bearing 27, a rotatable tool 1 coupled to the shaft 8, in particular a saw blade, a milling cutter or a grinding wheel, and a strain gauge arrangement 2 for detecting a mechanical quantity 3 which depends on a force emanating from the tool 1, wherein the strain gauge arrangement 2 is arranged on a stationary structure section 5 which is coupled in a force-transmitting manner to the pivot bearing 27 and not on the pivot bearing 27, comprising the steps: detecting S1 the mechanical quantity 3 and recognizing S2 the event and/or state of the power tool 10, 20, 30, 40, 50 according to mechanical quantity 3.

Expediently, the method is performed using one of the power tools 10, 20, 30, 40, 50 described above.

Preferably, the method has a further step in which one of the reactions discussed above is executed in response to the recognized event and/or state.

Figure 10:
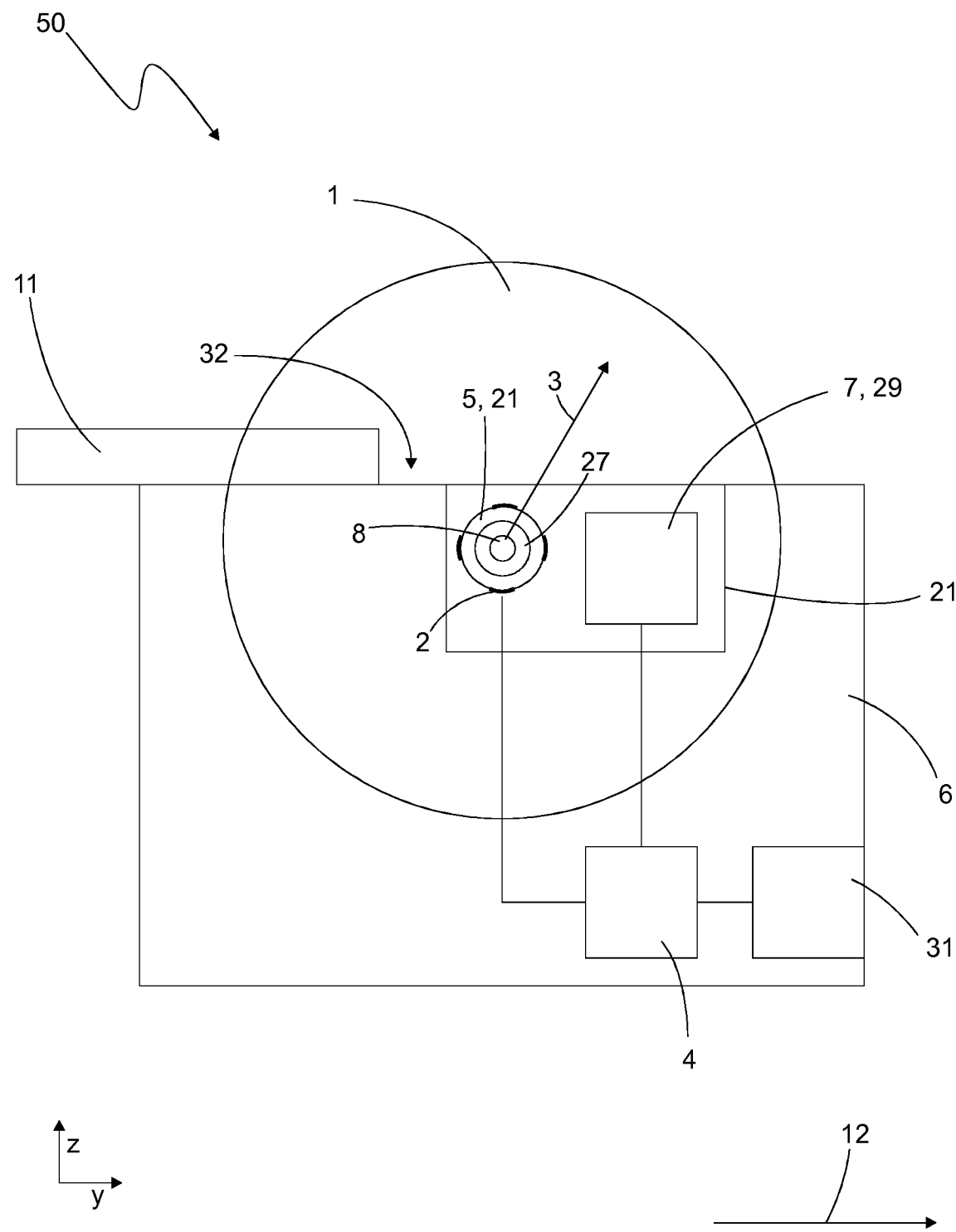

FIG. 10 shows a power tool 50 according to a fifth embodiment. The power tool 50 is exemplarily designed as a stationary saw, in particular as a circular table saw. The power tool 50 includes the features already discussed above in connection with the power tool 10. Furthermore, for the power tool 50, the strain gauge arrangement 2 and/or support structure 21 may be designed to correspond to the second to fourth embodiment.

As an example, tool 1 rotates counterclockwise. Expediently, the workpiece 11 is pushed into the tool 1, which is designed as a saw blade, so that the saw teeth saw into the workpiece 11 from top to bottom. FIG. 10 shows a corresponding feed direction 12. The directional ranges 14, 15, 16 and/or the directional thresholds 17, 18 are adapted accordingly for the power tool 60. For example, the directional ranges 14, 15, 16 and/or the directional thresholds 17, 18 shown in FIG. 8 may be point-mirrored around the center of the diagram.

The invention claimed is:

1. A power tool comprising:
a support structure,
a pivot bearing arranged on the support structure,
a shaft mounted on the support structure via the pivot bearing,
a rotatable tool coupled to the shaft,
a strain gauge arrangement for detecting a mechanical vector quantity which depends on a force emanating from the tool, and
a control device adapted to recognize an event and/or a state of the power tool according to the detected mechanical vector quantity,
wherein the strain gauge arrangement is arranged on a stationary structure section coupled in a force-transmitting manner to the pivot bearing and is not arranged on the pivot bearing, wherein the stationary structure section is part of the support structure and/or is arranged directly on the support structure, wherein the strain gauge arrangement comprises a plurality of strain gauges which are distributed on a path running around the shaft, and wherein the strain gauge arrangement is adapted to detect the mechanical vector quantity as an at least two-dimensional vector by measuring a mechanical quantity underlying the mechanical vector quantity in at least two different spatial directions,
wherein the support structure comprises a bearing flange and the stationary structure section is part of the bearing flange, wherein the pivot bearing comprises an outer ring and an inner ring which is mounted so as to be rotatable relative to the outer ring, wherein the shaft is mounted on the inner ring and the pivot bearing abuts with the outer ring against an radially inward facing surface of the bearing flange, wherein the bearing flange has a pivot bearing receptacle section, in which a pivot bearing receptacle is located, in which the pivot bearing is inserted, and the bearing flange further has a collar section adjoining the pivot bearing receptacle section in an axial direction of the shaft, wherein the strain gauge arrangement is arranged on a radially outward facing outer surface of the collar section.

2. The power tool according to claim 1, wherein the pivot bearing is arranged directly on the support structure.

3. The power tool according to claim 1, wherein the support structure reaches around the pivot bearing and/or the stationary structure section reaches around the support structure.

4. The power tool according to claim 1, wherein the strain gauge arrangement is arranged on a surface of the stationary structure section facing away from the pivot bearing and/or directed radially outwards, and/or is arranged on a radially inwardly directed surface of the stationary structure section.

5. The power tool according to claim 1, wherein the strain gauge arrangement is arranged, in the axial direction of the shaft, in a same first axial region as the pivot bearing, in a second axial region adjoining the first axial region and/or in a third axial region spaced apart from the first axial region.

6. The power tool according to claim 1, wherein the control device is adapted to recognize the event and/or the state of the power tool according to a direction and/or a change of direction of the mechanical vector quantity.

7. The power tool according to claim 1, wherein the control device is adapted to recognize, as the event and/or the state to be recognized, a kickback, a forward sawing, a backward sawing, a plunging of the tool into a workpiece and/or a state of wear of the power tool.

8. The power tool according to claim 7, wherein the control device is adapted to recognize, as the state to be recognized, a state of wear of the tool.

9. The power tool according to claim 1, wherein the control device is adapted to provide a signal in response to the recognized event and/or the recognized state, in order to cause the tool to be braked and/or to cause the tool to be moved from an operating position into a safety position.

10. The power tool according to claim 1, wherein the rotatable tool is a saw blade, a milling cutter or a grinding wheel.

11. The power tool according to claim 1, wherein the at least two different spatial directions comprise a spatial direction parallel to a feed direction and a spatial direction perpendicular to the feed direction, wherein the feed direction is the direction in which the power tool is to be moved relative to a workpiece in order to machine the workpiece or in which a workpiece is to be moved relative to the power tool in order to machine the workpiece.

12. The power tool according to claim 1, wherein the path runs around the shaft in circumferential direction of the shaft.

13. The power tool according to claim 1, wherein the path lies within an axial range of the shaft.

14. A power tool comprising:
a support structure,
a pivot bearing arranged on the support structure,
a shaft mounted on the support structure via the pivot bearing,
a rotatable tool coupled to the shaft,
a strain gauge arrangement for detecting a mechanical vector quantity which depends on a force emanating from the tool, and
a control device adapted to recognize an event and/or a state of the power tool according to the detected mechanical vector quantity,
wherein the strain gauge arrangement is arranged on a stationary structure section coupled in a force-transmitting manner to the pivot bearing and is not arranged on the pivot bearing, wherein the stationary structure section is part of the support structure and/or is arranged directly on the support structure, wherein the strain gauge arrangement comprises a plurality of strain gauges which are distributed on a path running around the shaft, and wherein the strain gauge arrangement is adapted to detect the mechanical vector quantity as an at least two-dimensional vector by measuring a mechanical quantity underlying the mechanical vector quantity in at least two different spatial directions,
wherein the support structure is part of a gearbox housing of the power tool, wherein the pivot bearing comprises an outer ring and an inner ring which is mounted so as to be rotatable relative to the outer ring, wherein the shaft is mounted on the inner ring and the pivot bearing abuts with the outer ring against an radially inward facing surface of the gearbox housing, wherein the strain gauge arrangement is located on a radially outward facing surface of the gearbox housing.

15. A method for retrofitting a power tool with a retrofit arrangement, wherein the power tool comprises a pivot bearing, a shaft mounted via the pivot bearing, the pivot bearing having an outer ring and an inner ring which is mounted so as to be rotatable relative to the outer ring, wherein the shaft is mounted on the inner ring, and the power tool further comprises a rotatable tool coupled to the shaft, and wherein the retrofit arrangement comprises a bearing flange having a pivot bearing receptacle section for receiving the pivot bearing of the power tool, a collar section adjoining the pivot bearing receptacle section, and a strain gauge arrangement arranged on an radially outward facing outer surface of the collar section, the strain gauge arrangement comprising a plurality of strain gauges which are distributed on a path running around the collar section, and wherein the strain gauge arrangement is adapted to detect a mechanical vector quantity as an at least two-dimensional vector by measuring a mechanical quantity underlying the mechanical vector quantity in at least two different spatial directions, the method comprising the step of:
installing the retrofit arrangement in the power tool so that the pivot bearing is inserted into the pivot bearing receptacle section, the pivot bearing abuts with the outer ring against an radially inward facing surface of the bearing flange, the bearing flange is coupled in a force-transmitting manner to the pivot bearing, the mechanical vector quantity detected by the strain gauge arrangement depends on a force emanating from the tool, and a control device of the power tool is adapted to recognize an event and/or a state of the power tool according to the mechanical vector quantity.

16. The method according to claim 15, wherein the rotatable tool is a saw blade, a milling cutter or a grinding wheel.

17. The method according to claim 15, wherein the power tool to be retrofitted is a fully functional power tool.

* * * * *